(12) United States Patent
Stammberger et al.

(10) Patent No.: US 11,059,224 B2
(45) Date of Patent: Jul. 13, 2021

(54) PLANT FOR ADDITIVELY MANUFACTURING OF THREE-DIMENSIONAL OBJECTS

(71) Applicant: CL SCHUTZRECHTSVERWALTUNGS GMBH, Lichtenfels (DE)

(72) Inventors: Jens Stammberger, Rödental (DE); Tanja Kroher, Weitramsdorf (DE); Andreas Ullrich, Breitengrüßbach (DE); Daniel Winiarski, Bad Staffelstein (DE)

(73) Assignee: CONCEPT LASER GMBH, Lichtenfels (DE)

( * ) Notice: Subject to any disclaimer, the term of this patent is extended or adjusted under 35 U.S.C. 154(b) by 215 days.

(21) Appl. No.: 15/987,727

(22) Filed: May 23, 2018

(65) Prior Publication Data

US 2019/0022932 A1 Jan. 24, 2019

(30) Foreign Application Priority Data

Jul. 21, 2017 (EP) .................................. 17182653

(51) Int. Cl.
*B29C 64/20* (2017.01)
*B33Y 30/00* (2015.01)
(Continued)

(52) U.S. Cl.
CPC .............. *B29C 64/20* (2017.08); *B22F 10/20* (2021.01); *B28B 1/001* (2013.01);
(Continued)

(58) Field of Classification Search
CPC ........ B29C 64/20; B29C 64/268; B33Y 30/00
See application file for complete search history.

(56) References Cited

U.S. PATENT DOCUMENTS

| | | | |
|---|---|---|---|
| 2013/0064706 A1* | 3/2013 | Schwarze | B22F 10/20 419/1 |
| 2013/0108726 A1 | 5/2013 | Uckelmann et al. | |
| 2014/0227820 A1* | 8/2014 | Franklin | B23K 26/0673 438/57 |
| 2017/0173883 A1* | 6/2017 | Gray | B23K 26/103 |

(Continued)

FOREIGN PATENT DOCUMENTS

| | | | | |
|---|---|---|---|---|
| DE | 19953000 A1 | 5/2001 | | |
| DE | 10235427 A1 * | 2/2004 | ............. | B33Y 30/00 |

(Continued)

OTHER PUBLICATIONS

European Search Report Corresponding to Application No. 17182653 dated Jan. 9, 2018.

(Continued)

*Primary Examiner* — Cachet I Proctor
(74) *Attorney, Agent, or Firm* — Dority & Manning, P.A.

(57) ABSTRACT

Plant (1) for additively manufacturing of three-dimensional objects (2), comprising at least two apparatuses (3, 4) for additively manufacturing of three-dimensional objects (2) by means of successive layerwise selective irradiation and consolidation of layers of a build material (5) which can be consolidated by means of an energy beam (6-9), wherein a separate beam generating unit (10) configured to generate at least one energy beam (6-9) that is guidable to at least one of the apparatuses (3, 4).

14 Claims, 2 Drawing Sheets

Figure 1:
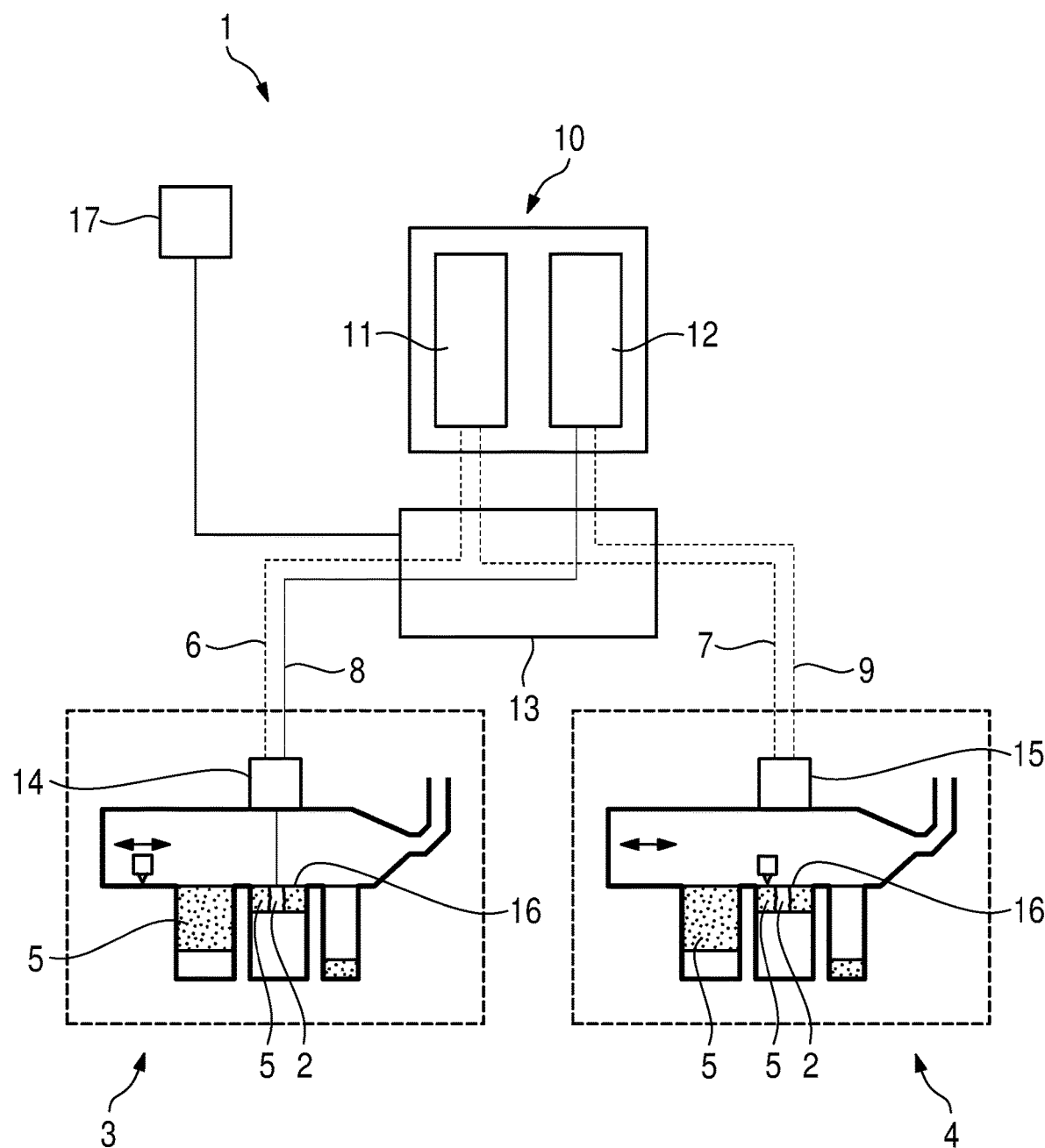

(51) Int. Cl.

| | |
|---|---|
| *B29C 64/277* | (2017.01) |
| *B29C 64/282* | (2017.01) |
| *B29C 64/264* | (2017.01) |
| *B22F 10/20* | (2021.01) |
| *B33Y 10/00* | (2015.01) |
| *B33Y 50/02* | (2015.01) |
| *B29C 64/153* | (2017.01) |
| *B29C 64/393* | (2017.01) |
| *B28B 1/00* | (2006.01) |
| *B28B 17/00* | (2006.01) |
| *B22F 10/30* | (2021.01) |

(52) U.S. Cl.
CPC ........ *B28B 17/0081* (2013.01); *B29C 64/153* (2017.08); *B29C 64/264* (2017.08); *B29C 64/277* (2017.08); *B29C 64/282* (2017.08); *B29C 64/393* (2017.08); *B33Y 10/00* (2014.12); *B33Y 30/00* (2014.12); *B33Y 50/02* (2014.12); *B22F 10/30* (2021.01)

(56) References Cited

U.S. PATENT DOCUMENTS

| | | | |
|---|---|---|---|
| 2017/0361405 A1* | 12/2017 | Renz | B23K 26/0626 |
| 2018/0161873 A1* | 6/2018 | Brown | B22F 3/1055 |
| 2018/0180803 A1* | 6/2018 | Victor | G02B 27/0994 |
| 2018/0326655 A1* | 11/2018 | Herzog | B29C 64/153 |

FOREIGN PATENT DOCUMENTS

| | | | |
|---|---|---|---|
| DE | 10235427 A1 | 2/2004 | |
| JP | H10211656 A | 8/1998 | |
| JP | 2014/513637 A | 6/2014 | |
| WO | 2016184888 A1 | 11/2016 | |
| WO | WO-2016184888 A1 * | 11/2016 | ............. B33Y 30/00 |

OTHER PUBLICATIONS

European Search Opinion Corresponding to Application No. 17182653 dated Jan. 17, 2018.
Machine Translated Japanese Office Action Corresponding to Application No. 2017222509 dated Sep. 19, 2019.

* cited by examiner

PLANT FOR ADDITIVELY MANUFACTURING OF THREE-DIMENSIONAL OBJECTS

CROSS-REFERENCE TO RELATED APPLICATIONS

This application claims priority to European Patent Application serial no. 17 182 653.0 filed Jul. 21, 2017, the contents of which are incorporated herein by reference in their entirety as if set forth verbatim.

DESCRIPTION

The invention relates to a plant for additively manufacturing of three-dimensional objects, comprising at least two apparatuses for additively manufacturing of three-dimensional objects by means of successive layerwise selective irradiation and consolidation of layers of a build material which can be consolidated by means of an energy beam.

Such plants are known from prior art, wherein three-dimensional objects can be manufactured using an energy beam that successively and selectively irradiates regions of the build material layer by layer. Usually, each apparatus of the plant comprises a beam generating unit, for example a laser beam source that generates an energy beam that is guided inside a build chamber of the apparatus to irradiate specific regions of build material. Hence, every apparatus comprises a beam source being constructively integrated in the apparatus, for example in the process chamber leading to increased costs, as beam generating units are comparatively expensive parts.

Further, the beam generated by the beam generating unit cannot be fully used as the beam cannot irradiate throughout the whole manufacturing process, for example the energy beam is shut off or suppressed, respectively, while the apparatus is coating. Since some beam sources continually provide an energy beam which is suppressed or blanked out whenever the energy beam is not used to irradiate the build material beam time is wasted.

It is an object to the present invention to provide a plant that uses a beam generating unit and/or a generated energy beam more efficiently.

The object is inventively achieved by a plant with the features according to the claims.

The apparatus described herein is an apparatus for additively manufacturing three-dimensional objects, e.g. technical components, by means of successive layerwise selective irradiation and consolidation of layers of a powdered build material ("build material") which can be consolidated by means of an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance.

The apparatus comprises a number of functional units which are used during its operation. Exemplary functional units are a process chamber, an irradiation device which is configured to selectively irradiate a build material layer disposed in the process chamber with at least one energy beam, and a stream generating device which is configured to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The invention suggests a separate beam generating unit configured to generate at least one energy beam that is guidable to at least one of the apparatuses. Deviant from prior art, a separate, in particular central, beam generating unit is provided that is not a built—in component to one of the apparatuses, but is configured to generate at least one energy beam that can be guided to the apparatuses of the plant. The beam generating unit is therefore, not constructively integrated into one of the apparatuses and is not a constructive unit built into one of the apparatuses.

The beam generating unit is for example a separate external unit configured to generate an energy beam that can be used for the irradiation of build material inside a plurality of apparatuses assigned to the plant or the beam generating unit, respectively. As will be described later on, the energy beam can be guided to the apparatuses selectively and dependent on various parameters.

Thus, the invention is based on the idea to generate an energy beam externally to the apparatuses and guide the energy beam to at least one apparatus, where the energy beam is needed. Therefore, the beam time can be more efficient, in particular completely, as the energy beam can selectively be guided to those apparatuses that perform an irradiation step or a step of the manufacturing process, wherein an energy beam is needed. Thus, while one of the apparatuses is in a manufacturing process, wherein an energy beam is not required, for example while the apparatus is coating, the energy beam can be guided to a different apparatus and therefore, can be used fully to irradiate the build material so that the wastage of beam time can be reduced or avoided. The term beam time refers to the time an energy beam is used or assigned to one of the apparatuses. The present invention allows for an efficient use of the beam time as the energy beam is used to irradiate the build material whenever it is assigned to the corresponding apparatus.

Additionally, it is sufficient to have a single or a reduced number of beam sources, in particular less beam generating units than apparatuses, that can be used more efficiently in comparison to prior art. Therefore, the costs can be reduced, while the beam time can be used more efficiently as the occupancy rate of the energy beam is increased.

Particularly preferred, a beam guiding unit is provided that is configured to distribute at least one energy beam selectively between at least two apparatuses and/or to guide at least one energy beam selectively to one or more apparatuses. Hence, the separate beam generating unit generates at least one energy beam which can be guided by the beam guiding unit to the apparatuses assigned to the plant. Also, the beam guiding unit is configured to distribute the energy beam selectively between the apparatuses of the plant. Advantageously, it is possible to have the beam generating unit generate the energy beam separately from the apparatuses and independent of the manufacturing process steps the single apparatuses perform. The beam guiding unit can, for example, guide the generated energy beam to each of the apparatuses dependent on a need for an energy beam.

According to another preferred embodiment of the present invention a control unit is provided that is configured to control the beam guiding unit dependent on at least one energy beam demand of at least one of the apparatuses, wherein the beam guiding unit distributes at least one energy beam dependent on the energy beam demand. Thus, an energy beam demand can be assigned to or determined for each of the apparatuses, wherein the energy beam demand expresses or specifies the need or the requirement of the single apparatus for an energy beam. Therefore, the energy beam demand can be regarded as a request for beam time by the respective apparatus. For example, for an apparatus that is in a manufacturing process that does not require an energy beam, a request for beam time is not sent or generated, but for an apparatus that is in an irradiation step or the next step is an irradiation step a request for beam time is generated or sent. Therefore, the energy beam demand expresses the need of the apparatus for energy beam time.

Hence, it is possible, to prioritize the beam time, in particular the guidance of the energy beam to a specific apparatus dependent on the energy beam demand to ensure the energy beam is guided to the apparatus with the greatest need for the energy beam or the respective energy beam demand, respectively. Thereby, it is possible to guide the energy beam completely to one of the apparatuses or to distribute the energy beam between two or more of the apparatuses of the plant. The beam generating unit can provide more than one energy beam, wherein each of the energy beams can be guided to one of the apparatuses completely or in part or can be distributed between at least two apparatuses in an arbitrary manner.

The inventive plant can further preferably be improved in that the energy beam demand comprises information relating to a process step of at least one apparatus and/or a status of a manufacturing process. Therefore, the energy beam demand contains information that correspond to a process step of the corresponding apparatus or for example a group of apparatuses. The information expresses in which process step or status of a manufacturing process the corresponding apparatus is in, for example which process step of the manufacturing cycle is currently performed by the apparatus. According to this information it is possible to evaluate or determine the need of the apparatus for an energy beam or for beam time, respectively.

Since the current process step and the subsequent process steps can be determined for each of the apparatuses by the control unit the sequence in which the energy beam is guided to the single apparatuses or distributed between the single apparatuses can be defined.

According to another embodiment of the present invention, the beam guiding unit is preferably configured to guide at least one energy beam to one apparatus dependent on the energy beam demand, in particular the status of a manufacturing process, of at least one other apparatus. Hence, the beam time can be distributed to the respective apparatuses, wherein the requests of the single apparatuses can be prioritized dependent on their energy beam demand. In other words, the beam time is distributed between the apparatuses with respect to the corresponding energy beam demands.

Therefore, it can be evaluated whether or not to guide at least one energy beam to one apparatus with respect to the energy beam demand of another apparatus. For example, if the plant comprises two apparatuses and one of the apparatuses is coating, the apparatus performing the coating step has no energy beam demand or the energy beam demand of the coating apparatus is "low". Thus, the energy beam can be guided to the other apparatus that performs an irradiation step depending according the respective energy beam demand. When the first apparatus finishes the coating step the control unit may determine that the next manufacturing step is an irradiation step, whereby the energy beam demand of the first apparatus may be changed from "low" to "high" and the beam time may be redistributed accordingly. Also, the control unit may determine that the subsequent step of the other apparatus does not involve an irradiation step and therefore, the corresponding energy beam demand is switched from "high" to "low". Of course, various states of an energy beam demand are possible, wherein the states "low" and "high" are only exemplary.

In accordance with another embodiment of the inventive plant at least one irradiation unit is provided that is configured to irradiate at least one region of the object and/or a segment of at least one layer dependent on at least one beam property of at least one energy beam. The irradiation unit controls the position of the energy beam on the build plane, i.e. the surface of the build material inside the build chamber the energy beam is guided, in particular focused on, to irradiate the build material. For example, the irradiation unit is a scanning unit configured to deflect the energy beam to a position on the build plane in which the build material has to be irradiated selectively.

Further, respective parts of the build material and/or respective regions on the build plane can be irradiated by means of different energy beams. This allows for the use of different energy beams for different irradiation tasks. Therefore, different regions of various layers of build material can be irradiated with different power levels and/or different wavelengths and/or different beam profiles. Thereby, the energy beams generated by the beam generating unit are guided to the at least one irradiation unit via guiding means, for example fiber optics and/or mirror assemblies.

According to another preferred embodiment of the invention, the beam generating unit comprises at least two energy beam sources. Each of the energy beam sources can for example be built as or comprise a laser, wherein the laser can, for example, be built as a laser diode. The energy beams generated via the two different energy beam sources can therefore, as described above, be guided or distributed to or between at least two apparatuses of the plant.

It is particularly preferred that the beam generating unit is configured to generate at least two energy beams with different or the same beam properties. Preferably, at least two energy beams vary in a wavelength of the energy beams and/or a power level of the energy beams and/or a beam profile of the energy beams. This allows for guidance and/or a distribution of the energy beams with respect to the beam properties. Thus, an energy beam can be used to irradiate build material in a region and/or a segment of a layer corresponding to the respective beam property. Since different regions and/or a segments of various layers of building material require different power levels and/or wavelengths for optimized irradiation and consolidation results this embodiment of the invention allows for guiding and/or distributing the energy beam that fits the corresponding requirements best.

Besides, the invention relates to a method for operating at least one plant for additively manufacturing of three-dimensional objects, comprising at least two apparatuses for additively manufacturing of three-dimensional objects by means of successive layerwise selective irradiation and consolidation of layers of a build material which can be consolidated by means of an energy beam, wherein at least one energy beam is generated by a separate beam generating unit and is guided to at least one of the apparatuses.

According to the inventive method an energy beam is generated by a separate beam generating unit which is arranged external to the apparatuses of the plant. The generated energy beam can afterwards be guided to one or more of the apparatuses of the plant. The inventive method can in particular be used to operate an inventive plant as described above. Self-evidently, all advantages, features and details described with respect to the inventive plant are fully transferable to the inventive method and vice versa.

Exemplary embodiments of the invention are shown with respect to the FIGS. The FIGS. are schematic views and show:

FIG. 1 an inventive plant in a first manufacturing state; and

Figure 2:
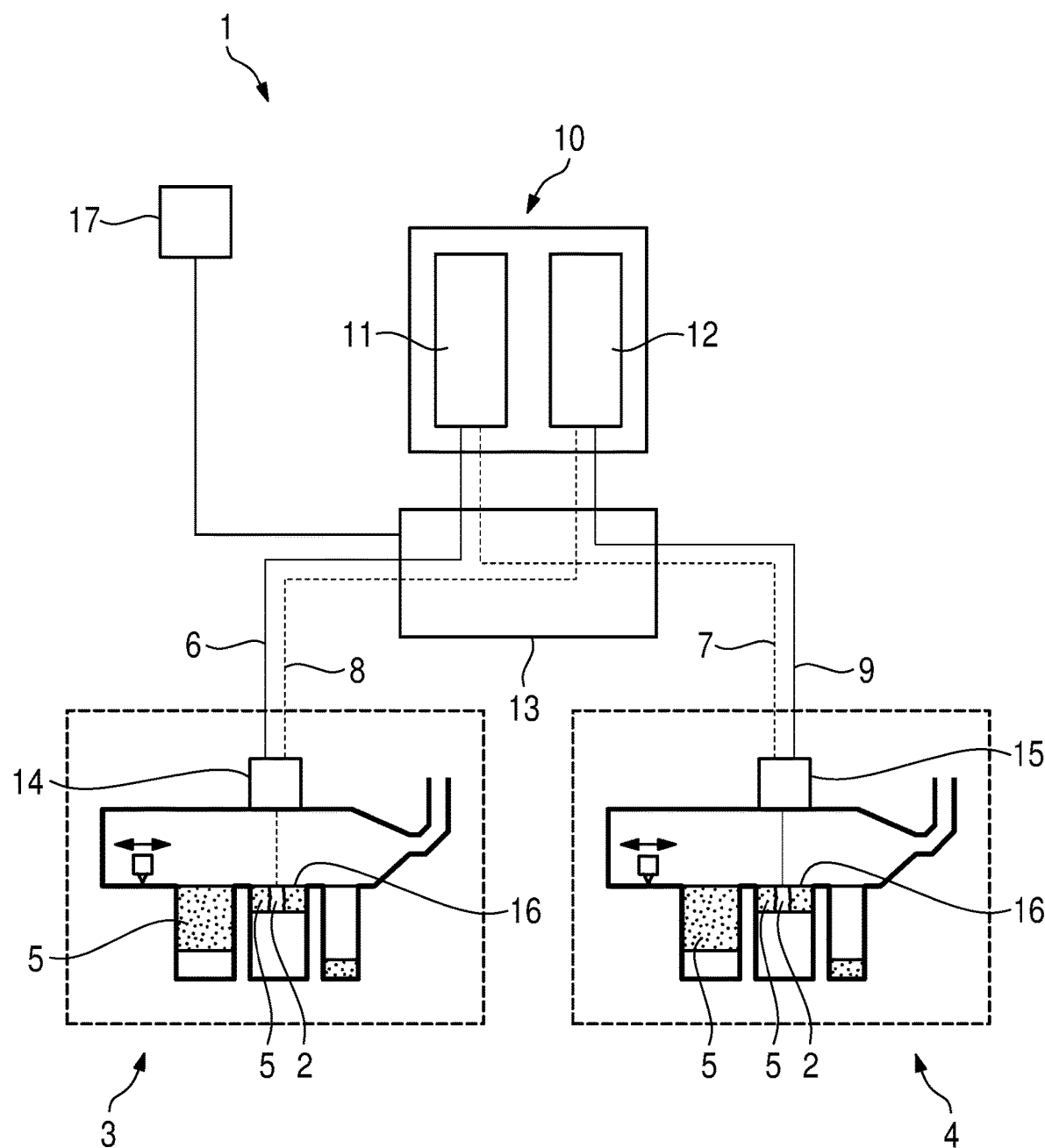

FIG. 2 the inventive plant of FIG. 1 in a second manufacturing state.

FIG. 1 shows a plant 1 for additively manufacturing of three-dimensional objects 2 comprising at least two apparatuses 3, 4 for additively manufacturing of three-dimensional objects 2 by means of successive layerwise selective irradiation and consolidation of layers of a build material 5, i.e. a metallic powder, which can be consolidated by means of an energy beam 6-9, i.e. a laser beam. Of course, the plant 1 may comprise a plurality of apparatuses, whereby for the easy of reference the apparatuses 3, 4 exemplary stand for an arbitrary amount of apparatuses. The plant 1 further comprises a separate beam generating unit 10 that is configured to generate the energy beams 6-9, wherein the energy beams 6-9 are guidable to the apparatuses 3, 4.

The separate beam generating unit 10 according to this embodiment comprises two beam sources 11, 12, wherein the beam source 11 is configured to generate the energy beams 6 and 7 and the beam source 12 is configured to generate the energy beams 8 and 9. Downstream of the beam generating unit 10 a beam guiding unit 13 is provided that is configured to guide the energy beams 6-9 to the respective irradiation unit 14, 15 of the apparatuses 3, 4. Self-evidently, each energy beam 6-9 can be a selectively guided via the beam guiding unit 13 to the apparatus 3 or the apparatus 4. Further, each of the energy beams 6-9 can be divided or distributed, for example via a beam splitter, between both apparatuses 3, 4 in an arbitrary manner.

The single energy beams 6-9 differ in at least one beam property, i.e. the beam power or the wavelength, although it is also possible to have energy beams 6-9 with similar or the same beam properties. For example the single energy beams 6-9 can differ in a power level, in particular the energy beams 6 and 7 may be of a same first power level and the energy beams 8 and 9 may be of a same second power level, wherein the first and the second power level are different. For example the first power level is 400 W and the second power level is 1000 W. Further, it is also possible that the energy beams 6 and 7 have a same first wavelength and the energy beams 8 and 9 have a same second wavelength, wherein the first and the second wavelength are different.

An energy beam 6-9 generated by the beam generating unit 10 is guidable via the beam guiding unit 13 to the apparatus 3 and/or the apparatus 4. In particular, the energy beams 6-9 can be guided to the irradiation units 14, 15 which are configured to guide the energy beams 6-9 on a build plane 16 in the respective build chamber of the apparatuses 3, 4. Of course, each of the energy beams 6-9 may be splitted, for example by a beam splitter, and thereby distributed arbitrarily between the apparatuses 3 and 4.

Further, a control unit 17 is provided that is configured to determine an energy beam demand of the apparatuses 3, 4 of the plant 1. The energy beam demand expresses the requirement of the single apparatuses 3, 4, for an energy beam to be guided to the apparatuses 3, 4 or beam time, respectively, wherein the guidance of the energy beams 6-9 to the respective apparatus 3, 4 can be prioritized with respect to the determined energy beam demand. According to the manufacturing state depicted in FIG. 1, the apparatus 4 performs a coating step, wherein a coater conveys fresh build material 5 on the build plane 16. In this manufacturing process step an irradiation via one of the energy beams 6-9 is not required or possible as the coater moves over the build plane 16. Therefore, the beam guiding unit 13 guides the corresponding energy beams 6-9 that are required by the apparatus 3 to the irradiation unit 14 that deflects the energy beams 6-9 onto the build plane 16 inside the process chamber of the apparatus 3 and thereby irradiates the respective regions of the current layer of build material 5.

Therefore, the energy beam demand determined from the apparatus 4 is "low"/"0" and the energy beam demand of the apparatus 3 is "high"/"1". Self-evidently, it is possible to have multiple states of the energy beam demand, for example a quantitive expression like a scale of 0 to 10 that expresses the requirement of energy beam time by the apparatuses 3, 4. Additionally, it is possible to evaluate which region of which layer should be irradiated by which energy beam 6-9. Since the single energy beams differ in at least one beam property, such as a power level and/or a wavelength and/or a beam profile, different energy beams 6-9 are more suitable to irradiate specific regions allowing for an optimized irradiation and consolidation result using the energy beam 6-9 that fits the corresponding requirement best.

FIG. 2 shows the plant 1 of FIG. 1 in a second manufacturing condition, wherein the apparatuses 3, 4 both perform an irradiation step, i.e. a manufacturing step, wherein an energy beam 6-9 is used. Therefore, the beam guiding unit 13 distributes the energy beams 6-9 corresponding to the determined energy beam demand of the apparatuses 3, 4. Of course, the control unit 17 can prioritize the beam time of the respective energy beams 6-9 according to the energy beam demand received from the apparatuses 3, 4. Additionally, a combination of the energy beams 6-9 in an arbitrary manner is also possible.

According to the invention it is possible to use the beam time of the energy beams 6-9 more efficiently. Whenever one of the apparatuses 3, 4 is in a process step, wherein an energy beam 6-9 cannot be used, the energy beam 6-9 can be guided to the other apparatus 3, 4 via the beam guiding unit 13 so that the beam time can be used more efficiently and the wastage of beam time is reduced or avoided. Self-evidently, the apparatuses 3, 4 are only exemplary and multiple apparatuses 3, 4 can be assigned to the beam generating unit 10. Also, the beam generating unit 10 can comprise a plurality of beam sources 11, 12 that generate a plurality of energy beams 6-9.

The invention claimed is:

1. A plant for additively manufacturing three-dimensional objects, the plant comprising:
at least two apparatuses configured for additively manufacturing three-dimensional objects by successive layerwise selective irradiation and consolidation of layers of a build material in a respective build plane; and,
a separate beam generating unit configured to generate at least two energy beams that are guidable to at least two apparatuses, wherein the at least two energy beams comprise different beam properties being applied to the respective build planes, and wherein the different beam properties comprise different beam profiles.

2. The plant of claim 1, further comprising a beam guiding unit configured to guide the at least two energy beams to the at least two apparatuses.

3. The plant of claim 2 further comprising a control unit configured to control the beam guiding unit based at least on an energy beam demand of at least one of the apparatuses.

4. The plant of claim 3, wherein the energy beam demand comprises information relating to a process step of at least one apparatus and/or a status of a manufacturing process.

5. The plant of claim 1 further comprising at least one irradiation unit configured to irradiate at least one region of the object and/or a segment of at least one layer dependent on at least one beam property of at least two energy beams.

6. The plant of claim 1, wherein the beam generating unit comprises at least two energy beam sources configured to generate the at least two energy beams, wherein the at least two energy beams comprise different beam properties.

7. The plant of claim 1, wherein the different beam properties further comprise different wavelengths and/or power levels.

8. A method for operating a plant for additively manufacturing three-dimensional objects, the method comprising:
generating at least two energy beams from a separate beam generating unit, wherein the at least two energy beams comprise different beam properties being applied to respective build planes, and wherein the different beam properties comprise different beam profiles; and
guiding the at least two energy beams to at least two apparatuses for additively manufacturing of three-dimensional objects by successive layerwise selective irradiation and consolidation of layers of a build material in the respective build planes.

9. The method of claim 8, wherein the at least two energy beams are selectively distributed between at least two apparatuses.

10. The method of claim 9, where guiding the at least two energy beams comprises a control unit control controlling a beam guiding unit to selectively distribute the at least wo energy beams to the at least two apparatuses based at least on an energy beam demands of at least one of the apparatuses.

11. The method of claim 10, wherein the energy beam demand comprises information relating to a process step of at least one apparatus and/or a status of a manufacturing process.

12. The method of claim 8, wherein the at least two energy beams are selectively distributed between at least two apparatuses via a beam guiding unit.

13. The method of claim 8 further comprising:
irradiating at least one region of the object via an irradiation unit dependent on at least one beam property of at least one energy beam.

14. The plant of claim 8, wherein the different beam properties further comprise different wavelengths and/or power levels.

* * * * *